United States Patent [19]
Croseck et al.

[11] 4,341,510
[45] Jul. 27, 1982

[54] MULTIPLE PRESS FOR CERAMIC MOLDINGS

[75] Inventors: Hans-Henning Croseck, Konz; Rolf Jung, Trier, both of Fed. Rep. of Germany

[73] Assignee: Laeis-Werke AG, Trier, Fed. Rep. of Germany

[21] Appl. No.: 177,830

[22] Filed: Aug. 13, 1980

[30] Foreign Application Priority Data

Aug. 31, 1979 [DE] Fed. Rep. of Germany ....... 2935156

[51] Int. Cl.³ .......................... B29C 1/14; B28B 3/06
[52] U.S. Cl. .................................. 425/149; 264/40.5; 425/193; 425/351; 425/410; 425/412; 425/422; 425/457; 100/269 R
[58] Field of Search ............... 425/135, 149, 182, 183, 425/344, 346, 351, 453, 454, 457, 186, 192 R, 193, 408, 412, 422, 431, 430, 434, 581, 338, 339, 340, 346, 406, 410, 411; 83/635; 264/40.5

[56] References Cited

U.S. PATENT DOCUMENTS

| | | | |
|---|---|---|---|
| 1,744,352 | 1/1930 | Ackerman | 425/193 |
| 1,807,652 | 6/1931 | Dietrich | 83/635 |
| 1,992,314 | 2/1935 | Laussucq | 425/344 |
| 3,890,413 | 6/1975 | Peterson | 264/297 |

*Primary Examiner*—Willard E. Hoag

[57] ABSTRACT

A multiple press having a plurality of molds for forming ceramic moldings. The press includes a base frame on which a movable mounting plate is mounted. The movable mounting plate carries a plurality of mold halves. The base frame also includes a fixed mounting plate having a plurality of cylindrical bores in which a plurality of punch carriers are slidably mounted. Each punch carrier holds a mold half which mates with the confronting mold half on the movable mounting plate. The cylindrical bores being in communication with a source of a pressure medium so that a "pressure pad" is formed behind each punch carrier during the molding process.

5 Claims, 2 Drawing Figures

MULTIPLE PRESS FOR CERAMIC MOLDINGS

CROSS-REFERENCE TO RELATED APPLICATION

This application is related to our copending application entitled IMPROVED PRESS FOR MOLDINGS filed simultaneously with this application.

BACKGROUND OF THE INVENTION

The invention relates to a press for multiple molds, particularly for ceramic moldings, consisting of a plurality of punches respectively, on a movable and a fixed mounting plate and for a stripper platen engaged by the plunger.

With the so-called "dry presses" recently introduced to the state of the art a number of moldings are produced simultaneously in each pressing operation. Each of the mounting plates supporting the punches is therefore equipped with a number of these punches adjacent to one another. Consequently, such an arrangement requires greater dimensions for the mounting plates. It is therefore unavoidable that the known molds should be subjected to unequal pressures between the individual plungers, resulting in unequal compression in the moldings produced simultaneously in the press and thus rendering them to some extent useless. This defect becomes particularly evident in moldings of which the thickness and/or diameter varies in the individual molds.

SUMMARY OF THE INVENTION

It is therefore a general object of the invention to provide an improved mold of the above type which operates in such a manner that moldings are evenly compressed, particularly moldings such as plates or tiles, of different size and/or thickness. Such moldings can be produced simultaneously in a press, by applying a pressure suitable for each particular molding.

In the solution proposed by the invention the punches are displaceable in a mounting plate. In the arrangement of the invention a hollow space filled with a pressure medium is formed between the rear wall of each punch and the wall of the mounting plate. The hollow spaces can be interconnected behind the punches of the mounting plate. In one embodiment of the invention the hollow spaces are disposed one behind the other, and these spaces are in communication during the pressing process. The same fluid pressure thus occurs in all the hollow spaces. The specified pressure on each molding is controlled by the size of the area on which the pressure medium acts, on the rear wall of the punch, and by the area of the molding. With exactly similar moldings in the mold, therefore, the area of the rear wall of the punch can be given the same size as the pressure surface of the individual molding, in order to ensure the same specific pressure on all the moldings and thus an even rate of compression for these moldings. According to the specific pressure required on the molding, however, the said surfaces can also be designed in a certain relationship to one another. With those moldings having pressure surfaces of different sizes the area of the rear wall of each punch, in relation to the pressure surface of the corresponding moldings, is dimensioned to ensure an equal specific pressure on each molding. According to the invention, therefore, the ratio at which that area of the rear wall of the punch which is subjected to pressure medium bears to the pressure surface of the relevant molding is predetermined by the specific pressure required on the molding. When, therefore, equal compression is preferred for the moldings to be produced from one and the same molding batch, the corresponding surface associated with one another are given the same size.

A further characteristic of the invention provides for one pressure limiting valve in the supply line to each hollow space, and shut-off valves in the connecting line for the open connection of the hollow spaces with one another. This makes it possible, when that surface of the punch which is subjected to pressure and the pressure surface of the molding do not conform to each other, to limit the pressure in each of the hollow spaces, if necessary, thus likewise adapting the process to the particular shape of molding concerned.

A further version of the invention includes punch carriers which are displaceable in the mounting plate and beyond which the hollow spaces are formed filled with pressure medium. In this embodiment the rear surface of these punch holders which is subjected to pressure bears a certain predetermined ratio to the pressure surface of the associated mold. The interposition of the punch carriers enables the punches, which have to be changed when the moldings are replaced by others of a different shape, to be made with a smaller size.

The invention also provides for adjustable stops for the purpose of limiting the advance of the punches. These stops may consist of stop rings having a threaded portion enabling them to be adjusted on holding devices connected with the mounting plate. All the punches can thus be positioned simultaneously by applying pressure to the hollow spaces. The advance and return movement of the punch or punch holders can be rendered possible, according to the invention, by guide bushings provided on holding devices of the mounting plate. One version of the invention provides for a holding system for the punches which is based on a permanent electromagnet. This makes it possible to dispense with the screw connections which retard the process of changing the tools. Moreover, in the case of a press with three adjacent molds, it is of advantage, according to the invention, for the two outer molds to be allocated to moldings of equal or approximately equal pressure surface area. This facilitates the application of even pressure.

Finally, the invention provides that the hollow spaces, which form a so-called "pressure pad," should preferably be present in the mixed mounting plate. It has been found of advantage to allow the pressure in the pressing process to be exerted by the movable punch situated opposite the pressure pad.

BRIEF DESCRIPTION OF THE DRAWING

The mold to which the invention relates will be explained in greater detail by reference to the description of one constructional version thereof, and to the schematic drawing appended hereto. The drawing illustrates cross-sectional views through the mold for three moldings, as follows.

DESCRIPTION OF THE PREFERRED EMBODIMENT

Figure 1:
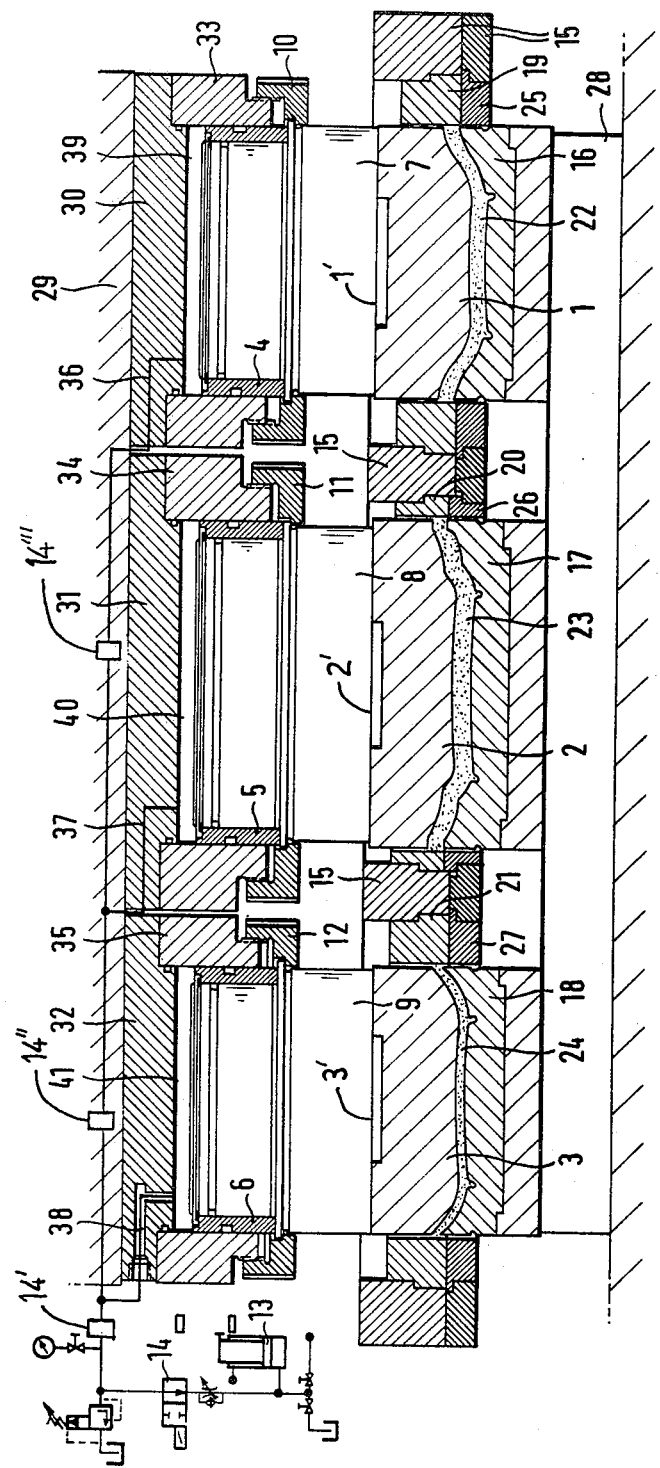
FIG. 1 is a cross-sectional view of the arrangement in the "filling position"

The punches 1, 2 and 3 are mounted on punch carriers 7, 8 and 9 via electromagnets 1' 2", 3" and are slidably guided in guide bushings 4, 5 and 6 in holding devices 33, 34 and 35 provided with locking covers 30, 31 and 32 of the fixed mounting plate 29. The advance of the punches 1, 2 and 3 is delimited by stops 10, 11 and 12 of the annular type, adjustably connected, via a screw threading, with the holding devices 33, 34 and 35. Hollow spaces 39, 40 and 41, connected to one another and to a valve 14, are formed between the plunger holders 7, 8 and 9 and the covers 30, 31 and 32, via connecting conduits 36, 37 and 38. The pressure medium is fed into the hollow spaces 39, 40 and 41 through the cylinder 13. The stripper platen 15, which can be pushed into position over the punches 1–3 and 16–18, is constructed with filler rings 19, 20 and 21, having filling gaps not shown in the drawing, and with pressure rings 25, 26 and 27. The molds for different moldings have reference numbers 22, 23 and 24. The punches 16, 17 and 18 of the molds are supported on the movable mounting plate 28. The hollow spaces 39, 40, 41 are interconnected via the conduits 36, 37 and 38 and check valves 14', 14", 14'''.

The drawing shows how those surfaces of the punch carriers which are subjected to pressure can be adapted according to the invention, to the pressure surfaces of the moldings in such a way that both surfaces will in effect be of equal size. While the diameters of the two outer molds 22 and 24 are approximately equal, the diameter of the inner mold 23 is greater. The diameter of the rear surface of the relevant plunger holder 8 will thus likewise be greater. The drawing also shows that a thin molding is pressed in the left-hand mold 24, a molding of medium thickness in the right-hand mold 22 and the molding with the maximum wall thickness in the middle mold 23.

The multiple press described above operates as follows:

At the beginning of the pressing process, i.e. of the advance of the movable punches 16, 17 and 18, the fixed punch 2 of the mold filled to the greatest extent, i.e. the middle mold 23, comes in contact with the molding batch. Owing to the communication between the "pressure pads" behind the punches 1, 2 and 3, the said punch at first yields, thus exerting no compressive force. Only after the other two punches 1 and 3 have come to rest on the mold batch will an equal specific pressure build up on all parts of the mold resulting in uniform compression, even if the molding are of different thickness.

Figure 2:
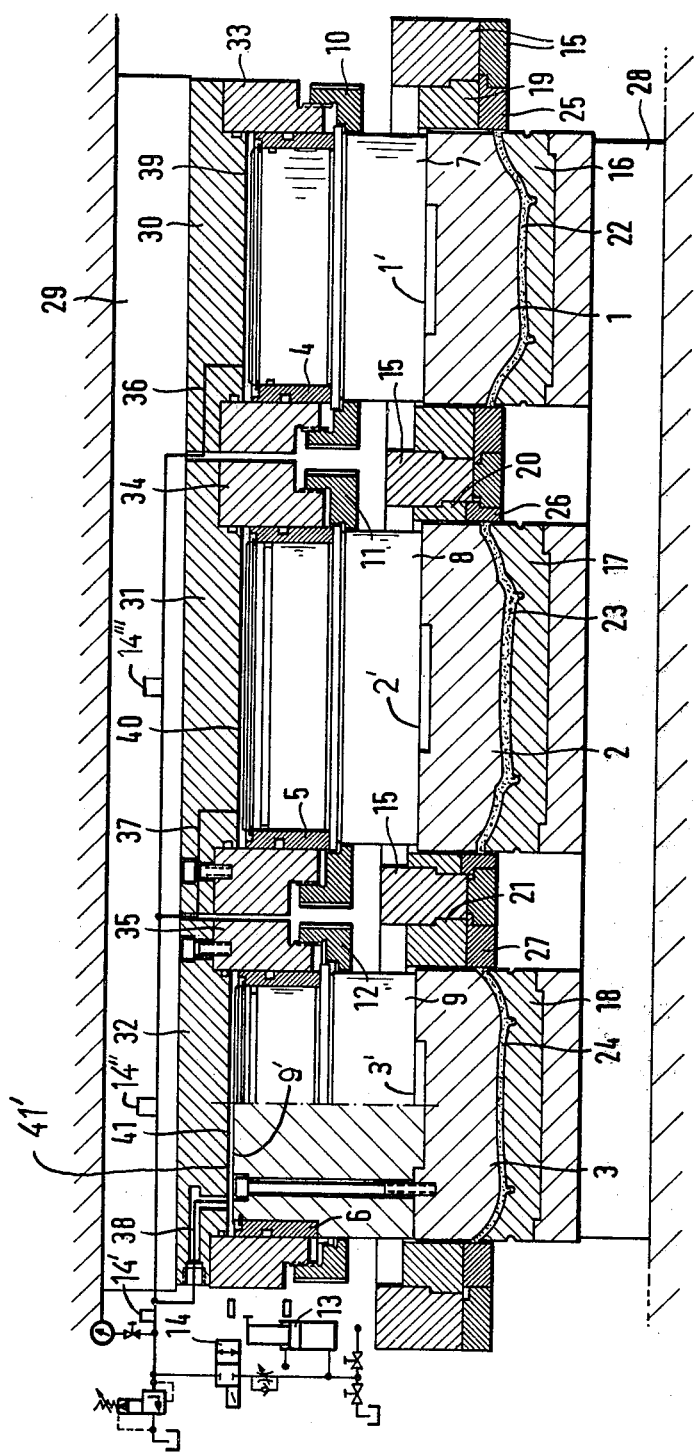
FIG. 2 is a cross-sectional view of the arrangement in the "pressing position."

In FIG. 2 the punch carrier 9 is shown in section on the left-hand portion of the mold. This diagram clearly shows the slight distance of a rear wall 3' from the molding plate wall 41' situated in front of it and constructed as a cover part 32. It also shows how it is secured to the mold by one of a number of screws not shown in the drawing.

The "pressure pads" are formed behind the punches 1, 2 and 3 due to the fact that the hollow spaces 39, 40, 41 are in communication via conduits 36, 37, 38 by means of the piston-cylinder 13 containing, for example, hydraulic oil with a hydraulic pressure source.

Although the invention is illustrated and described with reference to a plurality of embodiments thereof, it is to be expressly understood that it is in no way limited to the disclosure of such preferred embodiments, but is capable of numerous modifications within the scope of the appended claims.

What we claim is:

1. A multiple press having molding means for forming ceramic moldings, comprising in combination:
    a base frame
    a movable mounting plate operatively mounted in said base frame and carrying a plurality of mold halves therein;
    a fixed mounting plate operatively mounted in said base frame opposite said movable mounting plate and having a plurality of cavities;
    a plurality of punch carriers slidably mounted in said cavities, each punch carrier having a punch which has a mold half which mates with a mold half on said movable mounting plate, as to form a pair of confronting mold halves;
    each cavity of said plurality of cavities having a bottom wall and the corresponding punch carrier having a confronting rear wall, said bottom wall and confronting rear wall forming a pressure medium receiving chamber therebetween;
    a source of pressure medium; and conduit means connecting each receiving chamber to said source and during the pressing operation to each other; and wherein said plurality of punches of said carriers have different diameters and corresponding filler rings to permit using punches of different diameters on different ones of said carriers, and means for regulating pressure on said punches to provide the same maximum specific pressure for the mold halves on said movable mounting plate during molding.

2. The multiple press having molding means for forming ceramic moldings, as set forth in claim 1, wherein said cylinder bores in said fixed mounting plate are formed by holding devices rigidly mounted on said fixed mounting plate, each holding device having a guide bushing coaxially mounted thereon for slidingly guiding a punch carrier.

3. The multiple press having molding means for forming ceramic moldings, as set forth in claim 1, wherein said multiple press has two outer and one inner mold, the two outer molds have pressure surfaces of equal size.

4. The multiple press having molding means for forming ceramic moldings, as set forth in claim 1, including one pressure limiting valve in said conduit means between said source of pressure medium and said receiving chambers and shut-off valve means in said conduit means between all adjoining receiving chambers.

5. The multiple press having molding means for forming ceramic moldings, as set forth in claim 4, wherein said cavities are in the form of cylinder bores and said punch carriers are in the form of pistons which are slidably axially movable in said cylinder bores.

* * * * *